United States Patent
Dombrovskii

(10) Patent No.: US 11,750,254 B2
(45) Date of Patent: Sep. 5, 2023

(54) STEERING MATRIX DERIVATION

(71) Applicant: MAXLINEAR, INC, Carlsbad, CA (US)

(72) Inventor: Evgenii Dombrovskii, Nizhny Novgorod (RU)

(73) Assignee: MaxLinear, Inc., Carlsbad, CA (US)

( * ) Notice: Subject to any disclaimer, the term of this patent is extended or adjusted under 35 U.S.C. 154(b) by 0 days.

(21) Appl. No.: 17/739,672

(22) Filed: May 9, 2022

(65) Prior Publication Data

US 2022/0263555 A1    Aug. 18, 2022

Related U.S. Application Data

(63) Continuation of application No. 17/099,208, filed on Nov. 16, 2020, now Pat. No. 11,336,349.

(30) Foreign Application Priority Data

May 13, 2020    (RU) ................................ 2020115778

(51) Int. Cl.
    *H04B 7/06*    (2006.01)
    *H04L 5/00*    (2006.01)
    *H04B 7/0452*    (2017.01)

(52) U.S. Cl.
    CPC ......... *H04B 7/0617* (2013.01); *H04B 7/0452* (2013.01); *H04B 7/0639* (2013.01); *H04L 5/0048* (2013.01)

(58) Field of Classification Search
    CPC .. H04B 7/0617; H04B 7/0452; H04B 7/0639; H04B 7/0663; H04B 7/0636; H04L 5/0048; H04L 25/0224
    See application file for complete search history.

(56) References Cited

U.S. PATENT DOCUMENTS

| | | |
|---|---|---|
| 9,755,712 B1 | 9/2017 | Bultan et al. |
| 9,793,965 B1 | 10/2017 | Pustovalov et al. |
| 2010/0002801 A1 | 1/2010 | Jia et al. |
| 2013/0022141 A1 | 1/2013 | Song et al. |
| 2018/0262253 A1 | 9/2018 | Rahman et al. |
| 2020/0052762 A1* | 2/2020 | Yang ............... H04B 7/0619 |
| 2020/0112353 A1* | 4/2020 | Liu ................. H04B 7/0658 |

(Continued)

OTHER PUBLICATIONS

Aleksiejunas "MIMO Channel Reconstruction from Lower Dimensional Multiple Antenna Measurements" Wireless Personal Communications 96, 543-562, 2017.

(Continued)

*Primary Examiner* — Aristocratis Fotakis
(74) *Attorney, Agent, or Firm* — Buchalter; Jason W. Croft

(57) ABSTRACT

An example method may include obtaining first beamforming feedback from a station based on first sounding signals from a first set of antennas selected from multiple antennas of an access point, and obtaining second beamforming feedback from the station based on second sounding signals from a second set of antennas selected from the multiple antennas of the access point. The method may also include, using the first beamforming feedback and the second beamforming feedback, determining correlational relationships between pairs of the multiple antennas of the access point, and deriving a beamforming steering matrix from the correlational relationships.

20 Claims, 5 Drawing Sheets

(56) References Cited

U.S. PATENT DOCUMENTS

| | | |
|---|---|---|
| 2020/0153491 A1 | 5/2020 | Yang et al. |
| 2020/0195315 A1* | 6/2020 | Wang .................... H04B 7/0658 |
| 2020/0304194 A1* | 9/2020 | Jeon ..................... H04B 7/0617 |
| 2020/0336341 A1 | 10/2020 | Tian et al. |
| 2021/0135720 A1 | 5/2021 | Zhang |
| 2021/0136566 A1 | 5/2021 | Manolakos et al. |

OTHER PUBLICATIONS

Zhang, et al. "Enhanced CSI Acquisition for FDD Multi-User Massive MIMO Systems" in IEEE Access, vol. 6, pp. 23034-23042, 2018.

* cited by examiner

STEERING MATRIX DERIVATION

CROSS-REFERENCE TO RELATED APPLICATION

This patent application claims the benefit of and priority to U.S. application Ser. No. 17/099,208 filed Nov. 16, 2020. The Ser. No. 17/099,208 application is incorporated in the present disclosure by reference in its entirety.

FIELD

The implementations discussed herein are related to deriving a steering matrix for beamforming a signal.

BACKGROUND

Unless otherwise indicated herein, the materials described herein are not prior art to the claims in the present application and are not admitted to be prior art by inclusion in this section.

Home, office, stadium, and outdoor networks, a.k.a. wireless local area networks (WLAN) are established using a device called a Wireless Access Point (WAP). The WAP may include a router. The WAP wirelessly couples all the devices of the local network, e.g. wireless stations such as: computers, printers, televisions, digital video (DVD) players, security cameras and smoke detectors to one another and to the Cable or Subscriber Line through which Internet, video, and television is delivered to the local network. Most WAPs implement the IEEE 802.11 standard which is a contention-based standard for handling communications among multiple competing devices for a shared wireless communication medium on a selected one of a plurality of communication channels. The frequency range of each communication channel is specified in the corresponding one of the IEEE 802.11 protocols being implemented, e.g. "a", "b", "g", "n", "ac", "ad", "ax", "ay", "be". Communications follow a hub and spoke model with a WAP at the hub and the spokes corresponding to the wireless links to each 'client' device or station (STA) utilizing the WLAN.

However, when beamforming for packet transmission from the WAP, some circumstances lead to inefficient or incomplete derivation of the steering matrix for the beamformed signal.

The subject matter claimed herein is not limited to implementations that solve any disadvantages or that operate only in environments such as those described above. Rather, this background is only provided to illustrate one example technology area where some implementations described herein may be practiced.

SUMMARY

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

Some example implementations described herein generally relate to steering matrix derivation. Some implementations provide a method, system, and/or apparatus to facilitate deriving the beamforming matrix.

An example method may include a method that may include obtaining first beamforming feedback from a station based on first sounding signals from a first set of antennas selected from multiple antennas of an access point, and obtaining second beamforming feedback from the station based on second sounding signals from a second set of antennas selected from the multiple antennas of the access point. The method may also include, using the first beamforming feedback and the second beamforming feedback, determining correlational relationships between pairs of the multiple antennas of the access point, and deriving a beamforming steering matrix from the correlational relationships.

The present disclosure may be implemented in hardware, firmware, or software.

Associated devices and circuits are also claimed.

Additional features and advantages of the present disclosure will be set forth in the description which follows, and in part will be obvious from the present disclosure, or may be learned by the practice of the present disclosure. The features and advantages of the present disclosure may be realized and obtained by means of the instruments and combinations particularly pointed out in the appended claims. These and other features of the present disclosure will become more fully apparent from the following description and appended claims or may be learned by the practice of the present disclosure as set forth hereinafter.

BRIEF DESCRIPTION OF THE DRAWINGS

To further clarify the above and other advantages and features of the present disclosure, a more particular description of the present disclosure will be rendered by reference to specific implementations thereof which are illustrated in the appended drawings. It is appreciated that these drawings depict only typical implementations of the present disclosure and are therefore not to be considered limiting of its scope. The present disclosure will be described and explained with additional specificity and detail using the accompanying drawings in which.

DETAILED DESCRIPTION OF SOME EXAMPLE IMPLEMENTATIONS

Figure 1:
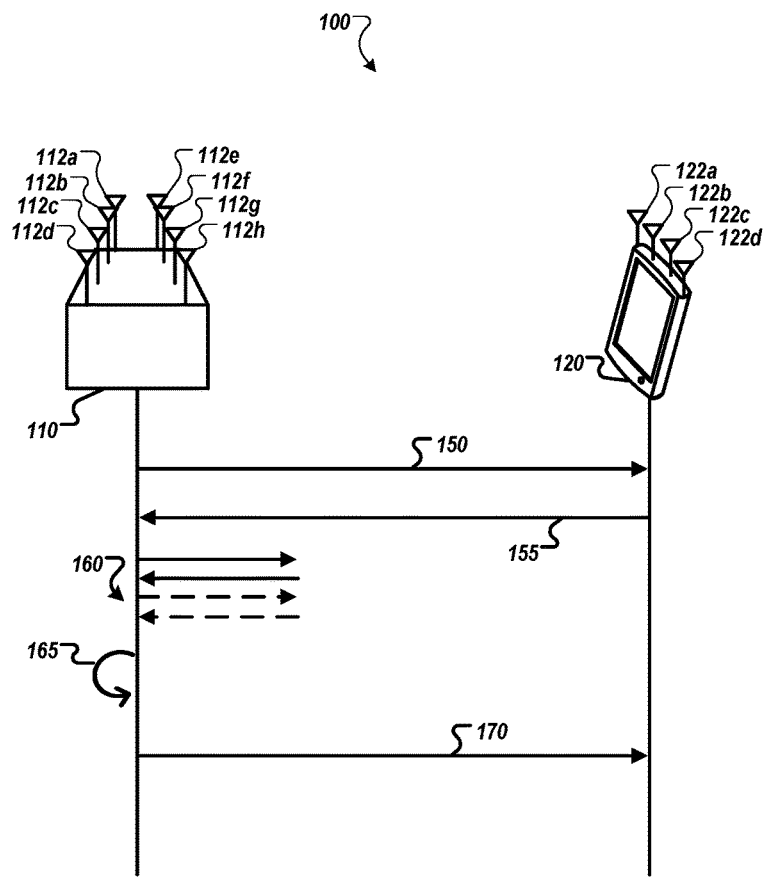
FIG. 1 illustrates an example environment within which a steering matrix may be derived, including communications between an access point and a station to facilitate deriving the steering matrix.

Implementations described herein may generally include an advanced approach to deriving a steering matrix for beamforming a signal. Some circumstances permit the straightforward use of feedback from a station to be used as the steering matrix for an access point communicating with the station (e.g., if both devices have the same number of antennas). However, if there is a mismatch in the number of antennas between the devices, the feedback does not provide full information regarding all of the antennas for beamforming a signal from the access point to the station. This can result in inefficient beamforming by the access point.

The present disclosure includes an approach to deriving a beamforming matrix for an access point communicating with one or more stations that is transparent to the stations. Different sets of antennas of the access point may transmit different sounding signals such that feedback may be received from the station for each potential pairing of antennas of the access point. For each component of feedback, the correlational relationships between the antennas of the access point that sent the sounding signal for the feedback may be combined into a sub-set of the correlational relationships of the antennas of the access point. The correlational relationships between the antennas of the access point as derived for the different feedbacks from the different sounding signals may be combined into a complete representation of all of the correlational relationships for all of the antennas of the access point that transmitted the sounding signals. The correlational relationships among the antennas of the access point as conveyed in the feedback from the station may be used to derive a steering matrix for the station. The steering matrix may be used to beamform signals from the access point to the station.

By using one or more of the principles of the present disclosure to derive a steering matrix, network performance may be improved. For example, a station may be able to receive a signal from further away and/or with higher throughput because of an improved steering matrix for beamforming the signal. Such improvements may reduce overall network traffic as lost or degraded packets may not have to be resent. Additionally, such improvements may improve network speeds observed by consumers using wireless networks. For example, an improved steering matrix may permit more spatial streams to a station, yielding a higher throughput to the station. Furthermore, consistent with at least some embodiments of the present disclosure, any combination or configuration of antennas may be used when sending the sounding signals. Additionally, the approaches described herein scale for any mismatch in number of antennas between the station and access point. Also, the approaches described herein may circumvent and remove any potential phase rotations or other variations between the received sounding feedback. Additionally, if the performance from the typical steering matrix is sufficient, the improved steering matrix may be used to broadcast at a reduced radiated power while still obtaining the same performance, thereby improving power usage of the access point and/or decreasing clutter and excessive signals in the wireless space.

Reference will now be made to the drawings to describe various aspects of example implementations of the present disclosure. It is to be understood that the drawings are diagrammatic and schematic representations of such example implementations, and are not limiting of the present disclosure, nor are they necessarily drawn to scale.

FIG. 1 illustrates an example environment 100 within which a steering matrix may be derived for beamforming a signal from an access point (AP) 110 to a station 120, in accordance with one or more embodiments of the present disclosure. For simplicity, the environment is illustrated with one AP, the AP 110, and one station, the station 120, although it will be appreciated that the principles of the present disclosure are applicable to any number of APs communicating with any number of stations. Within the environment 100, the AP 110 and the station 120 may wirelessly communicate with each other.

In operation, the AP 110 may announce and/or transmit a null data packet (NDP) sounding signal 150. For example, an explicit sounding may be initiated by the AP 110 sending an NDP Announcement (NDPA) frame. The NDPA identifies the AP 110 and the target recipient station(s) (e.g., the station 120) for the sounding. Next, the AP 110 may send the sounding signal 150. The sounding signal may include the NDP with no user data, instead including a common preamble field in the header of the packet. For example, the IEEE 802.11ac standard identifies the preamble field as the VHT-LTF field (very high throughput long training field). The LTF field may include a long training sequence used for multi-input multi-output (MIMO) channel estimation by the station 120. The station 120 may determine the corresponding beamforming matrix to adjust the phase and amplitude of subsequent MIMO transmissions by the AP 110 so as to improve the received signal strength at the station 120. The station 120 may then respond with beamforming feedback 155 that may include channel state information (CSI) including the beamforming matrix $V_k$, a square matrix of dimension equal to a number of receiver chains available at the station 120 and responsive to the sounding resource k. In the example shown, the $V_k$ matrix is a 4×4 matrix as the station 120 includes four antennas 122, including the antennas 122a-122d.

In some embodiments, the AP 110 may select a first set of antennas 112 of the antennas 112a-h to use when sending the sounding signal 150. For example, the AP 110 may first transmit the sounding signal 150 with the antennas 112a-112d (e.g., a first sounding signal) and the antennas 112e-112h may not transmit the sounding signal 150. The beamforming feedback 155 may represent feedback returned by the station 120 based on the transmission of the sounding signal 150 using the antennas 112a-112d. By sending the sounding signal 150 with the antennas 112, a correlational relationship based on the spatial relationships between the pairs of antennas may be derived from the beamforming feedback 155. For example, when the antennas 112a-112d transmit the sounding signal, a correlational relationship between the antenna 112a and the antenna 112b, the antenna 112a and the antenna 112c, the antenna 112a and the antenna 112d, the antenna 112b and the antenna 112c, the antenna 112b and the antenna 112d, and the antenna 112c and the antenna 112d may be observed. As another example, if the station 120 included two antennas 122 instead of four, two antennas 112 of the AP 110 may transmit the sounding signal 150, such as the antennas 112a and 112b such that the correlational relationship between the antenna 112a and the antenna 112b may be derived from the beamforming feedback 155.

The communications 160 represent additional sounding signals from the AP 110 and responsive beamforming feedback from the station 120 used to obtain correlational relationships among all of the pairs of antennas 112 of the AP 110. For example, a second sounding signal may be transmitted using the antennas 112c-112f, a third sounding signal using the antennas 112e-h, a fourth sounding signal using the antennas 112a-b and 112g-h, a fifth sounding signal using the antennas 112a-b and 112e-f, and a sixth sounding signal using the antennas 112c-d and 112g-h. By using multiple sounding signals, each potential pairing of the antennas 112 may have feedback such that the correlational relationships among each of the pairings of antennas may be determined using the sounding feedback received from the station 120. For example, following the antenna 112a as an example, the first sounding signal provides correlational relationship information with the antennas 112b, 112c, and 112d, the fourth sounding signal provides for 112g and 112h, and the fifth sounding signal provides for 112e and 112f.

In some embodiments, the different sounding signals (e.g., the combination of 150 and 160) may be transmitted in parallel, but at different sounding tones. For example, six distinct sounding signals from various combinations of sets of antennas 112 may be transmitted at the same time but at different frequencies. Additionally or alternatively, the different sounding signals may be transmitted at the same or similar tones but at different times. For example, six distinct sounding signals from various combinations of sets of antennas 112 may be transmitted in successive time intervals but at the same tone (or at different tones). By sending the sounding signals in parallel, the sounding may occur more rapidly and with fewer time segments of wireless resource used by the sounding signals. Because of the variation in tones there may be some imprecision when determining the correlational relationships between the antennas 112. By sending the sounding signals at different times, variations due to frequency differences in the sounding signals may be reduced while increasing the amount of time taken to perform the sounding, which may increase the number of time segments of wireless resource utilized by the sounding signals.

In some embodiments, the operation 165 may represent the AP 110 deriving the steering matrix for communication with the station 120. In doing so, the feedback from the different sounding signals from the different sets of antennas 112 may be combined mathematically. For example, different correlational relationships between pairs of antennas 112 may be observed in the different feedbacks and the correlational relationships may be combined into a single representation of the correlational relationships across all of the antennas 112 of the AP 110. For example, the correlational relationships may be combined into a square correlational matrix of dimension of the number of antennas 112 (e.g., for the example illustrated in FIG. 1, an 8×8 matrix) with each element representing the relationship between the $i^{th}$ and $i^{th}$ antennas 112 of the AP 110. Using the correlational relationships among the antennas 112, a steering matrix may be derived for beamforming towards the station 120. For example, the eigenvectors of the correlational matrix may be used as the steering matrix. More eigenvectors may be derived from the correlational matrix than are used in the steering matrix. In these and other embodiments, the eigenvectors with the highest values may be used as the columns of the steering matrix.

The communication 170 may represent a transmission from the AP 110 to the station 120 beamformed using the steering matrix derived by the AP 110 based on the correlational relationships of the pairs of antennas 112.

Because the correlational relationships represent spatial relationships between the antennas, the correlational relationships are free from any common phase rotations or jumps that may take place in the beamforming feedback matrices from different NDP resources (e.g., different tones or slots). Because any phase rotations of beamforming feedback matrices are eliminated by using the correlational relationships and the correlational relationships are used to derive the steering matrix rather than the feedback itself, linear combinations from different sounding resources may be used to derive the steering matrix. For example, the correlational relationships from the feedback 155 may be combined with the correlational relationships from the feedback from 160 in a linear combination when deriving the steering matrix.

The process of sending sounding signals from the AP 110, receiving feedback from the station 120, combining the feedback to derive the correlational relationships between the antennas 112, and generating the steering matrix may be described mathematically. The feedback matrix from the station 120 for a sounding resource k may be represented by $V_k$. $V_k$ may include approximations of right eigenvectors of the singular value decompositions of estimations of the multi-input multi-output (MIMO) wireless channel matrix (H) for the sounding resource k. The size of the beamforming feedback matrix $V_k$ is $[N_{row}, N_{col}]$, where the number of rows ($N_{row}$) and columns ($N_{col}$) is limited by the number of space-time streams (STS) of the station 120 (e.g., the number of antennas 122). Following the example illustrated in FIG. 1, with the number of antennas at the receive end of the sounding signal ($N_{Rx}$) being four, the size of the beamforming feedback matrix $V_k$ will be 4×4 for each sounding resource k.

A mapping matrix $M_k$ may be used to represent the mapping of STSs of the station 120 to antennas 112 of the AP 110. For example, the dimensions of $M_k$ may be the number of antennas available at the AP 110 ($N_{Tx}$) by the number of space-time-streams available at the station 120 ($N_{STS}$). Following the example illustrated in FIG. 1 where the AP 110 has eight antennas and the station 120 has four antennas, the mapping matrix may be represented by:

$$M_k = \begin{bmatrix} m_{11} & m_{12} & m_{13} & m_{14} \\ m_{21} & m_{22} & m_{23} & m_{24} \\ m_{31} & m_{32} & m_{33} & m_{34} \\ m_{41} & m_{42} & m_{43} & m_{44} \\ m_{51} & m_{52} & m_{53} & m_{54} \\ m_{61} & m_{62} & m_{63} & m_{64} \\ m_{71} & m_{72} & m_{73} & m_{74} \\ m_{81} & m_{82} & m_{83} & m_{84} \end{bmatrix}$$

where $m_{ij}$ may represent the precoding weight from the $i^{th}$ antenna 112 of the AP 110 for the $j^{th}$ STS of the station 120. Using the mapping matrix $M_k$, the station 120 may be expected to receive the signals as $H_k M_k$ where $H_k$ may represent the channel matrix (e.g., the effect of the channel on signals transmitted between the AP 110 and the station 120). The mapping matrix $M_k$ may be used to identify which set of antennas 112 may be sending the sounding signal for a given sounding resource k, and which may not be sending the sounding signal. For example, the following set of mapping matrices $M_k$ may be used to provide feedback for each potential pair of antennas 112 of the AP 110:

$$M_1 = \begin{bmatrix} 1 & 0 & 0 & 0 \\ 0 & 1 & 0 & 0 \\ 0 & 0 & 1 & 0 \\ 0 & 0 & 0 & 1 \\ 0 & 0 & 0 & 0 \\ 0 & 0 & 0 & 0 \\ 0 & 0 & 0 & 0 \\ 0 & 0 & 0 & 0 \end{bmatrix} M_2 = \begin{bmatrix} 0 & 0 & 0 & 0 \\ 0 & 0 & 0 & 0 \\ 1 & 0 & 0 & 0 \\ 0 & 1 & 0 & 0 \\ 0 & 0 & 1 & 0 \\ 0 & 0 & 0 & 1 \\ 0 & 0 & 0 & 0 \\ 0 & 0 & 0 & 0 \end{bmatrix} M_3 = \begin{bmatrix} 0 & 0 & 0 & 0 \\ 0 & 0 & 0 & 0 \\ 0 & 0 & 0 & 0 \\ 0 & 0 & 0 & 0 \\ 1 & 0 & 0 & 0 \\ 0 & 1 & 0 & 0 \\ 0 & 0 & 1 & 0 \\ 0 & 0 & 0 & 1 \end{bmatrix}$$

$$M_4 = \begin{bmatrix} 1 & 0 & 0 & 0 \\ 0 & 1 & 0 & 0 \\ 0 & 0 & 0 & 0 \\ 0 & 0 & 0 & 0 \\ 0 & 0 & 0 & 0 \\ 0 & 0 & 0 & 0 \\ 0 & 0 & 1 & 0 \\ 0 & 0 & 0 & 1 \end{bmatrix} \quad M_5 = \begin{bmatrix} 1 & 0 & 0 & 0 \\ 0 & 1 & 0 & 0 \\ 0 & 0 & 0 & 0 \\ 0 & 0 & 0 & 0 \\ 0 & 0 & 1 & 0 \\ 0 & 0 & 0 & 1 \\ 0 & 0 & 0 & 0 \\ 0 & 0 & 0 & 0 \end{bmatrix} \quad M_6 = \begin{bmatrix} 0 & 0 & 0 & 0 \\ 0 & 0 & 0 & 0 \\ 1 & 0 & 0 & 0 \\ 0 & 1 & 0 & 0 \\ 0 & 0 & 0 & 0 \\ 0 & 0 & 0 & 0 \\ 0 & 0 & 1 & 0 \\ 0 & 0 & 0 & 1 \end{bmatrix}$$

For example, tracking the first antenna 112a (the first row), the first antenna 112a has feedback relative to the second, third and fourth antennas in $M_1$; with the second, seventh, and eighth antennas in $M_4$; and with the second, fifth, and sixth antennas in $M_5$. The beamforming feedback matrices $V_k$ (where k is one, four, and five from these different mapping matrices) may correspond to the effective channel $H_k M_k$ as right singular vectors from decompositions of the effective channel $H_k M_k$. For example, the feedback matrix $V_{k,Nr}$ may be a decomposition of the effective channel as follows:

$$H_k M_k = U_{k,Nr} \Lambda_{k,Nr} V_{k,Nr}^H$$

where $U_{k,Nr}$ may represent a unitary matrix and $\Lambda_{k,Nr}$ may include eigenvalues of the effective channel. A matrix representation of the correlational relationships between the sounding antennas using the feedback matrices $V_k$ may be computed according to the equation:

$$[H_k^H H_k]_{Nrow \times Nrow} = V_{k,Nr} \Lambda_{k,Nr}^2 V_{k,Nr}^2,$$

where $\Lambda_{k,Nr}^2$ are eigenvalues of the effective channel. The values of $\Lambda_{k,Nr}^2$ may be derived from multi-unit MIMO (MU-MIMO) exclusive feedback, or for single unit (SU) feedback, may be derived from a predefined average ratio between power observed in the streams.

To derive the sub-matrices of the correlational matrix ($R_{Tx}$), depermutation may be applied to the feedback matrix $V_{k,Nr}$ by left multiplying the mapping matrix $M_k$ with the feedback matrix $V_{k,Nr}$. Using such an approach, the sub-matrices of the correlation matrix may be estimated as:

$$\hat{R}_{Tx,k} = (M_k V_{k,Nr}) \Lambda_{k,Nr}^2 (M_k V_{k,Nr})^H$$

Such matrices may be sparse matrices with non-zero elements corresponding to the antennas 112 that transmitted the sounding signals, while those antennas 112 that did not transmit the sounding signals may include zero elements. For example, following the example of $M_1$:

$$\hat{R}_{Tx,k=1} = \begin{bmatrix} r_{11} & r_{12} & r_{13} & r_{14} & 0 & 0 & 0 & 0 \\ r_{21} & r_{22} & r_{23} & r_{24} & 0 & 0 & 0 & 0 \\ r_{31} & r_{32} & r_{33} & r_{34} & 0 & 0 & 0 & 0 \\ r_{41} & r_{42} & r_{43} & r_{44} & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \end{bmatrix}$$

where $r_{i,j}$ may represent the correlational relationship between the $i^{th}$ and $j^{th}$ antennas 112 based on the spatial relationship between the antennas 112. As another example, following the example of $M_4$:

$$\hat{R}_{Tx,k=4} = \begin{bmatrix} r_{11} & r_{12} & 0 & 0 & 0 & 0 & r_{17} & r_{18} \\ r_{21} & r_{22} & 0 & 0 & 0 & 0 & r_{27} & r_{28} \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ r_{71} & r_{72} & 0 & 0 & 0 & 0 & r_{77} & r_{78} \\ r_{81} & r_{82} & 0 & 0 & 0 & 0 & r_{87} & r_{88} \end{bmatrix}$$

When determining the full correlational matrix at sounding resource p ($R_{Tx,p}$), multiple different partial, sparse matrices $\hat{R}_{Tx,k}$ may be combined to derive the full matrix. For example, the following equation may be used:

$$R_{Tx,p} = \sum_{k=p-N_k/2}^{k=p+N_k/2} W_k \cdot \hat{R}_{Tx,k}$$

where $N_k$ may represent the number of sounding resources that may be combined to derive the full $R_{Tx,p}$ (following the example above, $N_k$ may be six). In this example, values of k may fluctuate above and below p by $N_k/2$. The value of $N_k$ may be a number large enough to include at least one full set of all different potential pairings of the antennas 112 of the AP 110. The value of $N_k$ may include the minimum number of sets of antennas 112 to cover all of the potential pairings of antennas 112. For example, each individual antenna 112 may have a correlational relationship with each other antenna 112 of the AP 110, or stated another way, each individual pairing of antennas (e.g., the antenna 112a and 112b) may have its own correlational relationship (e.g., the correlational relationship between the pair of antennas 112a and 112b). In some embodiments, the value of $N_k$ may include more than the minimum number of sets of antennas 112 to cover all of the potential pairings of antennas 112. For example, more samples of the sparse partial matrices may be desirable for circumstances of high coherence bandwidth. The variable $W_k$ may represent a weighting coefficient related to the shape of a window of the sounding resources (e.g., how close the other values of k are to p). In some embodiments, $W_k$ may include a value between zero and one, with one being used when k is the same as or close to p, and decreasing as k is further away from p. An example of values of $W_k$ is illustrated and described with reference to FIG. 2.

In some embodiments, the combination of sparse partial matrices $\hat{R}_{Tx,k}$ may result in redundancy in certain elements of the linear combination of the sparse partial matrices. For example, following the example above of the six steering matrices $M_{1-6}$ (e.g., $N_k$ is six), the values of $r_{11}, r_{22}, r_{12}, r_{21}$, etc. have multiple values for the pairing of antennas. The redundancy may result in a scaling matrix representative of the number of times a given pairing of antennas occurred:

$$R_{scaling} = \begin{bmatrix} 3 & 3 & 1 & 1 & 1 & 1 & 1 & 1 \\ 3 & 3 & 1 & 1 & 1 & 1 & 1 & 1 \\ 1 & 1 & 3 & 3 & 1 & 1 & 1 & 1 \\ 1 & 1 & 3 & 3 & 1 & 1 & 1 & 1 \\ 1 & 1 & 1 & 1 & 3 & 3 & 1 & 1 \\ 1 & 1 & 1 & 1 & 3 & 3 & 1 & 1 \\ 1 & 1 & 1 & 1 & 1 & 1 & 3 & 3 \\ 1 & 1 & 1 & 1 & 1 & 1 & 3 & 3 \end{bmatrix}$$

To normalize the full correlational matrix for the antennas 112 of the AP 110 when communicating with the station 120 based on the redundancy, each element of $R_{Tx,p}$ may be divided by its corresponding element in $R_{scaling}$. Stated mathematically, $$R_{Tx,p}^{norm}(i, j) = \frac{R_{Tx,p}(i, j)}{R_{scaling}(i, j)}$$

where i and j iterate over the range between one and $N_{Tx}$.

The normalized full correlational matrix $R_{Tx,p}^{norm}$ may represent all possible stochastic linear dependencies between the antennas 112 of the AP 110. Additionally, the normalized full correlational matrix $R_{Tx,p}^{norm}$ may include the information for derivation of a steering matrix covering all of the antennas 112 of the AP 110. An eigenvector decomposition of the normalized full correlational matrix $R_{Tx,p}^{norm}$ may yield eigenvectors $V_p$ that may be used in the beamforming steering matrix ($Q_p$). The eigenvectors may be derived based on the equation:

$$R_{Tx,p}^{norm} \cdot V_p = \Lambda_p^2 \cdot V_p$$

The eigenvector decomposition may yield a quantity of eigenvectors that is $N_{Tx}$. The steering matrix $Q_p$ may be limited in size based on the number of spatial streams available at the station 120. For example, the station 120 is illustrated as including four antennas 122 and so the steering matrix may be an 8×4 matrix. The eigenvectors from the normalized full correlational matrix $R_{Tx,p}^{norm}$ may be sorted in descending order based on their eigenvalues, and a number of the eigenvectors may be selected to fill the steering matrix. Following the example illustrated in FIG. 1, the top four eigenvectors may be selected and combined into the steering matrix $Q_p$.

Modifications, additions, or omissions may be made to the environment 100 without departing from the scope of the present disclosure. For example, the designations of different elements in the manner described is meant to help explain concepts described herein and is not limiting. Further, the environment 100 may include any number of other elements or may be implemented within other systems or contexts than those described. For example, any number of APs 110 and/or stations 120 may be included. While one mathematical approach is illustrated for determining and combining the correlational relationships between the antennas, any such mathematical approach is contemplated.

Additionally, the teachings are applicable to any type of wireless communication system. For example, while stations and access points are described for one context of wireless communication, the teachings of the iterative sounding to improve beamforming are also applicable to other wireless communication such as Bluetooth®, Bluetooth Low Energy, Zigbee®, Thread, mmWave, etc., and may be particularly applicable to any technology that uses beamforming.

Figure 2:
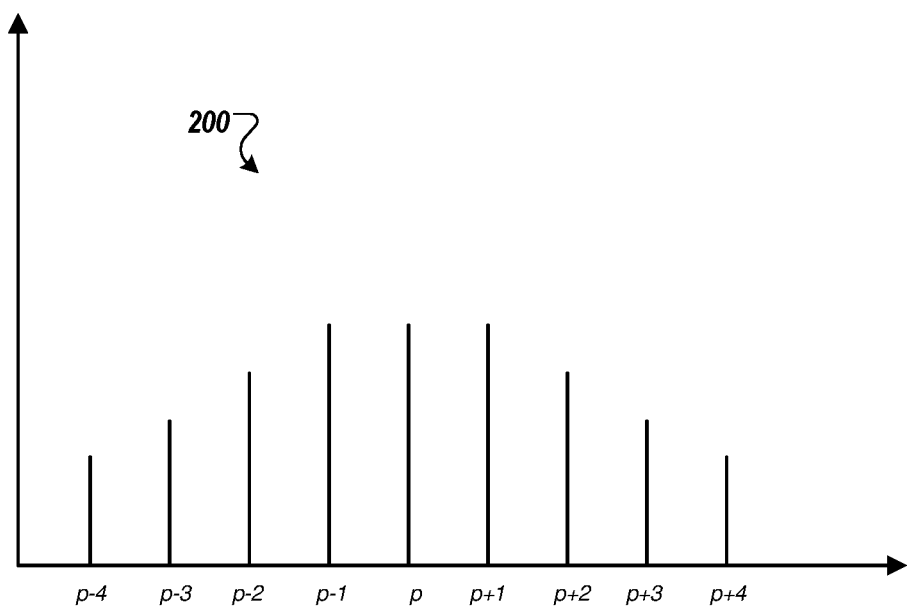
FIG. 2 illustrates a graph of various related sounding resources.

FIG. 2 illustrates a graph 200 of various related sounding resources (e.g., p, p+1, p−1, etc.), in accordance with one or more embodiments of the present disclosure. The graph 200 may visually depict the scaling factor (e.g., $W_k$ as explained with regard to the mathematics of FIG. 1) that may be used in combining separate correlational relationships from different sounding tones into the complete representation of the correlational relationships. FIG. 2 illustrates an example in which the number of different sets of antennas/sounding tones used is nine. The y-axis represents the relative values of the scaling factor (e.g., $W_k$), and the x-axis represents different values for the sounding resource k used, which extend outward from the sounding resource being analyzed p. For convenience, the graph 200 may be described within the context of multiple sounding signals being sent in parallel at different tones, but the principles are equally applicable to different sounding signals in different time slots, or to different time slots and different tones.

As illustrated in the graph 200, for the sounding resource p, one of the sets of antennas may sound at the frequency, resource unit (RU), etc. associated with the sounding resource p. Because the sounding resource p is the sounding resource around which the beamforming is being analyzed, the scaling factor for the correlational relationships in the feedback associated with p is one (e.g., the values representative of the correlational relationships are given their full weight). Additionally, because the frequencies are fairly close to p, the value of k that are at p−1 and p+1 also have a scaling factor of one.

As the values of k decrease further away from p, the scaling factor also decreases. For example, the values at p+2 and p−2 are less than that used for p or for p−1 and p+1. The scaling factor when k is at p−3 and p−4 drop further and further. By using the scaling factor, as the sounding tones k being used to determine the correlational relationships are further away from p, those correlational relationships have a decreased effect on the overall steering matrix as the frequencies are further away from the frequency being analyze, and as such, may experience different interference or other issues resulting in variations in signal degradation, etc. Stated another way, the confidence that the feedback is directly applicable is very high when the values of k are the same as or close to p, and the confidence decreases as the values of k are further away from p and the scaling factor represents that decrease in confidence.

Modifications, additions, or omissions may be made to the graph 200 without departing from the scope of the present disclosure. For example, other window shapes than that illustrated may be used. As a further example, any number of sounding signals may be used (such as six following the example in FIG. 1).

Figure 3:
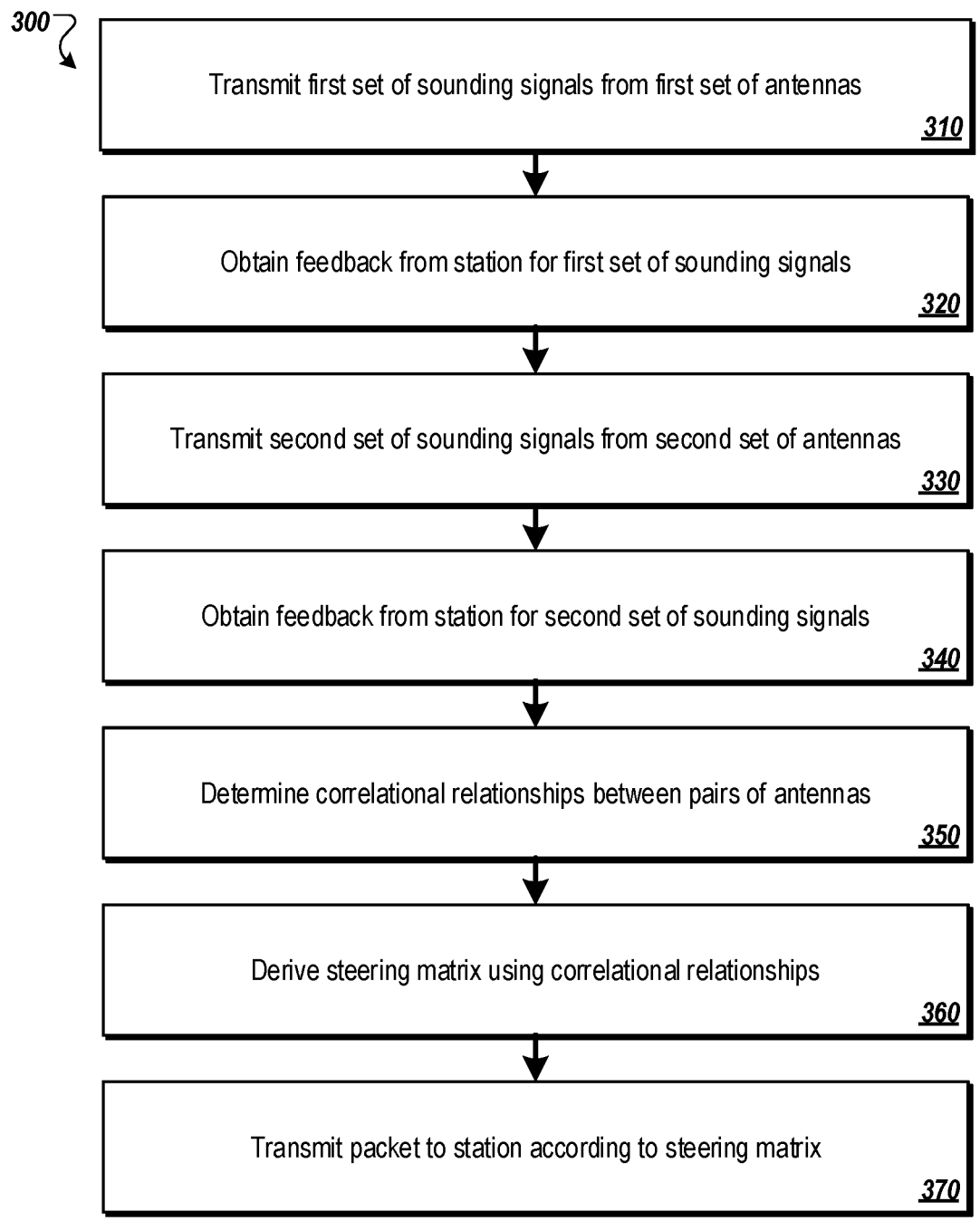
FIG. 3 illustrates a flowchart of an example method of deriving a steering matrix.

FIG. 3 illustrates a flowchart of an example method 300 of deriving a steering matrix, in accordance with one or more embodiments of the present disclosure. The method 300 may be implemented, in whole or in part, by the AP 110 of FIG. 1.

At block 310, a first set of sounding signals may be transmitted from a first set of antennas of an AP towards one or more stations. For example, a set of antennas in quantity corresponding to the number of STS available at the one or more stations may be selected for transmission of a given sounding tone.

At block 320, feedback may be obtained from the one or more stations that is responsive to the first set of sounding signals. For example, the feedback matrix $V_k$ corresponding to the sounding resource k may be transmitted from the one or more stations to the AP.

At block 330, a second set of sounding signals may be transmitted from a second set of antennas. The second set of antennas may be the same quantity as the first set of antennas. In some embodiments, the first and the second sounding signals may be transmitted in parallel, such as at the same time, and at different frequencies. In some embodiments, the first and the second sounding signals may be transmitted at different times and at the same frequency or frequencies.

At block 340, feedback may be obtained from the one or more stations that is responsive to the second set of sounding signals. For example, the feedback matrix $V_{k+1}$ corresponding to the sounding resource k+1 may be transmitted from the one or more stations to the AP.

At block 350, correlational relationships may be determined between pairs of the antennas. For example, the first set of feedback may be decomposed to determine the spatial relationships and the correlations therebetween based each discrete pairing of antennas within the first set. The first set of correlational relationships may represent a subset of all of the correlational relationships for all of the antennas of the AP. Similar correlational relationships may be determined based on the second set of feedback. Between the first set of feedback and the second set of feedback (and possibly additional sets of feedback), feedback regarding a correlational relationship may be obtained for each potential pairing of antennas of the AP.

At block 360, the steering matrix may be derived using the correlational relationships. For example, each of the discrete sets of correlational relationships from the different sets of feedback may be combined into a complete set of correlational relationships in a correlational matrix. A subset of the eigenvectors of the correlational matrix may be taken and used as the steering matrix.

At block 370, a packet may be transmitted from the AP to the station using the steering matrix derived at the block 360.

Figure 4:
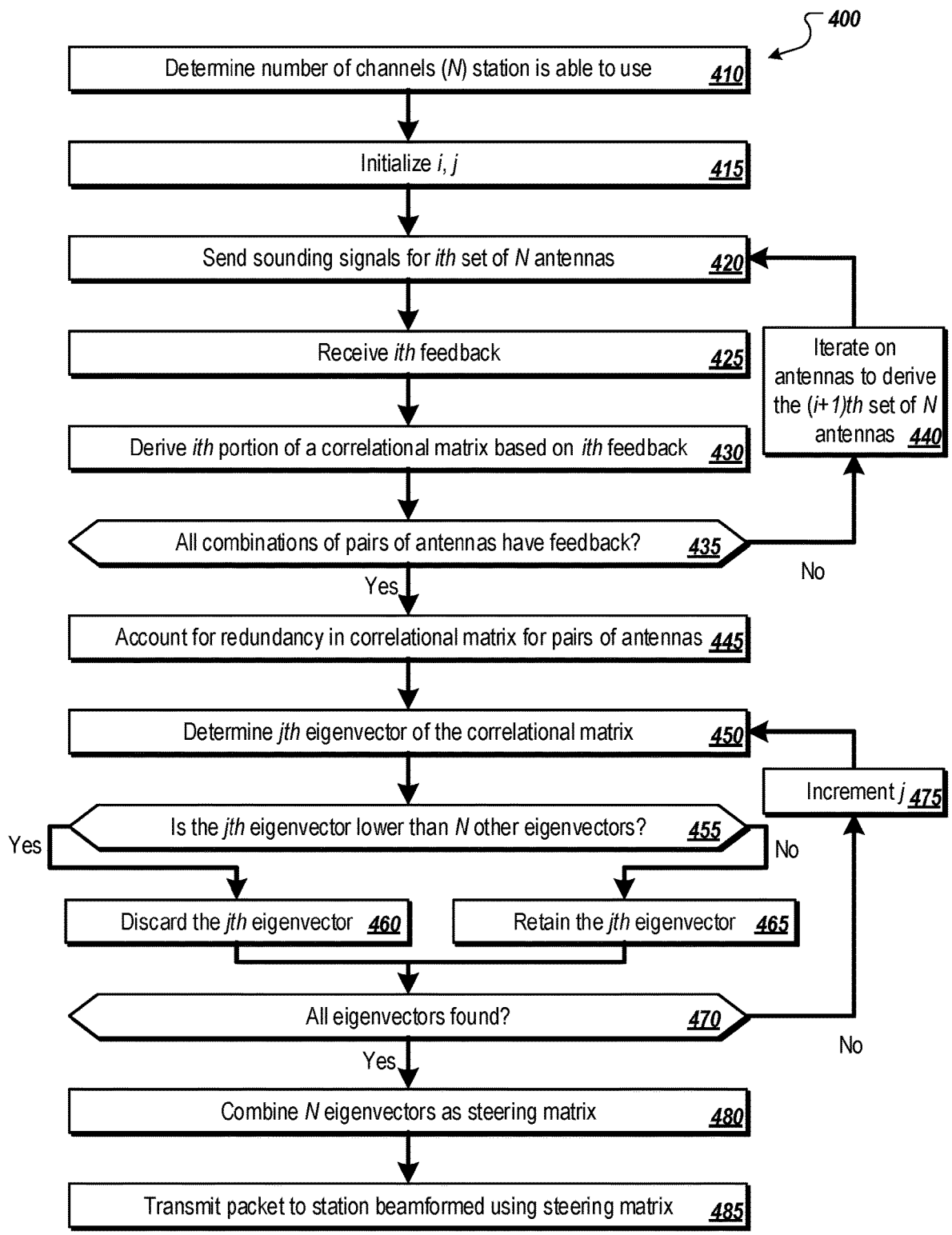
FIG. 4 illustrates a flowchart of another example method of deriving a steering matrix.

FIG. 4 illustrates a flowchart of another example method 400 of deriving a steering matrix, in accordance with one or more embodiments of the present disclosure. The method 400 may be implemented, in whole or in part, by the AP 110 of FIG. 1.

At block 410, a determination may be made regarding the number of channels (N) a station is able to use. For example, an initial sounding procedure may take place in which an AP (such as the AP 110 of FIG. 1) may send a sounding signal to a station (such as the station 120 of FIG. 1) that responds with less than a full feedback matrix (e.g., the feedback matrix V from the station may include less elements than the number of antennas of the AP). Based on the deficient feedback matrix, the AP may determine that a more advanced approach to determining a steering matrix, such as that disclosed in the present disclosure, is to be used. In some embodiments, an initial handshake or other data exchange between the station and the AP before the initial sounding (e.g., before the NDPA signal is transmitted) may indicate or otherwise designate the capabilities of the station. In these and other embodiments, the AP may determine that the more advanced approach to determining the steering matrix is to be used from the initial sounding signal that is transmitted.

At block 415, variables i and j are initialized for use in the method 400.

At block 420, a sounding signal may be sent for the $i^{th}$ set of N antennas. For example, the first four of eight antennas of a station may be an initial set of antennas that transmit a sounding signal if the station has the capability to send feedback regarding four space-time-streams. The $i^{th}$ set of antennas may be described or designated by a mapping matrix $M_k$.

At block 425, the $i^{th}$ feedback may be received by the AP. For example, the station may receive the sounding signal of the sounding resource k and may derive a feedback matrix for the sounding resource $V_k$.

At block 430, the $i^{th}$ portion of a correlational matrix may be derived based on the $i^{th}$ feedback. For example, a sub-matrix $\hat{R}_{Tx,p}$ at sounding resource k of the complete correlational matrix $R_{Tx,p}$ for the sounding resource p may be estimated according to the equation:

$$\hat{R}_{Tx,k} = (M_k V_{k,Nr}) \Lambda_{k,Nr}^2 (M_k V_{k,Nr})^H$$

In some embodiments, each of the portions of the correlational matrix may be linearly combined into the complete correlational matrix. For example, the sub-matrices may be combined according to the equation:

$$R_{Tx,p} = \sum_{k=p-N_k/2}^{k=p+N_k/2} W_k \cdot \hat{R}_{Tx,k}$$

In some embodiments, when combining the sub-matrices the individual sub-matrices may be adjusted based on the different tones used to obtain the different sub-matrices using a scaling factor $W_k$. The scaling factor may represent how close the sounding resource k used to obtain the sub-matrix is to the sounding resource p being analyzed.

At block 435, a determination may be made whether all potential combinations of pairs of antennas have feedback. For example, if the AP has eight antennas and the station has four antennas, at least six different sets of antennas may be used to obtain the feedback for each of the pairings of antennas. If not all potential combinations of pairs of antennas have feedback, the method 400 may proceed to the block 440. If all potential combinations of pairs of antennas have feedback, the method 400 may proceed to the block 445.

At block 440, the antennas may be iterated upon to derive the $(i+1)^{th}$ set of N antennas. For example, a set of mapping matrices may be obtained identifying which combinations of antennas are to send the sounding signals. After deriving the next set of antennas, the method 400 may return to the block 420 to send sounding signals and receive feedback using the next set of antennas. In some embodiments, all of the sounding signals to obtain all of the feedback for all of the sets of antennas may be transmitted in parallel and at different tones.

At block 445, redundancy within the correlational matrix may be accounted for to address pairs of antennas that included multiple sets of feedback. For example, in ensuring that all potential combinations of pairs of antennas have feedback at the block 435, certain combinations of antennas may have occurred more than once such that there is overlap in the pairs of antennas between the multiple sets of feedback. For example, a first set of feedback may be in response to first through fourth antennas, and a second set of feedback may be in response to first and second and seventh and eighth antennas such that both the first and second sets of feedback include the pairing of the first and second antennas. Additionally or alternatively, certain circumstances, such as high coherence bandwidth, more feedback may be obtained. In some embodiments, such an operation may be obtained by deriving a scaling matrix $R_{scaling}$ and applying it to the complete correlational matrix $R_{Tx,p}$ to normalize the values in the matrix. In some embodiments, such an operation may be performed according to the equation:

$$R_{Tx,p}^{norm}(i, j) = \frac{R_{Tx,p}(i, j)}{R_{scaling}(i, j)}$$

At block 450, the $j^{th}$ eigenvector of the correlational matrix may be determined. For example, the eigenvectors may be derived based on the equation:

$$R_{Tx,p}^{norm} \cdot Y_p = \Lambda_p^2 \cdot V_p$$

At block 455, a determination may be made whether the $j^{th}$ eigenvector is lower than N other eigenvectors. For example, the eigenvalues of the $j^{th}$ eigenvector may be compared to the top N other eigenvectors. If the $j^{th}$ eigenvector is lower than N other eigenvectors, the method 400 may proceed to the block 460. If the $j^{th}$ eigenvector is not lower than N other eigenvectors, the method 400 may proceed to the block 465.

At block 460, the $j^{th}$ eigenvector may be discarded. For example, when there are N eigenvectors that have higher eigenvalues, there are already a sufficient number of eigenvectors to construct a steering matrix for the station.

At block 465, the $j^{th}$ eigenvector may be retained. In some embodiments, if N eigenvectors had already been retained, the eigenvector with the lowest eigenvalues may be discarded when the $j^{th}$ eigenvector is retained such that N eigenvectors are retained.

At block 470, a determination may be made whether all eigenvectors for the correlational matrix have been found. If not all eigenvectors have been found for the correlational matrix, the method 400 may proceed to the block 475. If all eigenvectors have been found for the correlational matrix, the method 400 may proceed to the block 480.

At block 475, the value of j may be incremented. After incrementing the value of j, the method 400 may return to the block 450 to determine the next eigenvector of the correlational matrix.

At block 480, the N retained eigenvectors may be combined as the steering matrix. For example, the values of each of the N retained eigenvectors may serve as a column in the steering matrix Q.

At block 485, a packet that is beamformed using the steering matrix of the block 480 may be transmitted from the AP to the station.

One skilled in the art will appreciate that, for these and other processes and methods disclosed herein, the functions performed in the processes and methods may be implemented in differing order, simultaneously, etc. Furthermore, the outlined steps and operations are only provided as examples, and some of the steps and operations may be optional, combined into fewer steps and operations, or expanded into additional steps and operations without detracting from the essence of the disclosed implementations.

Figure 5:
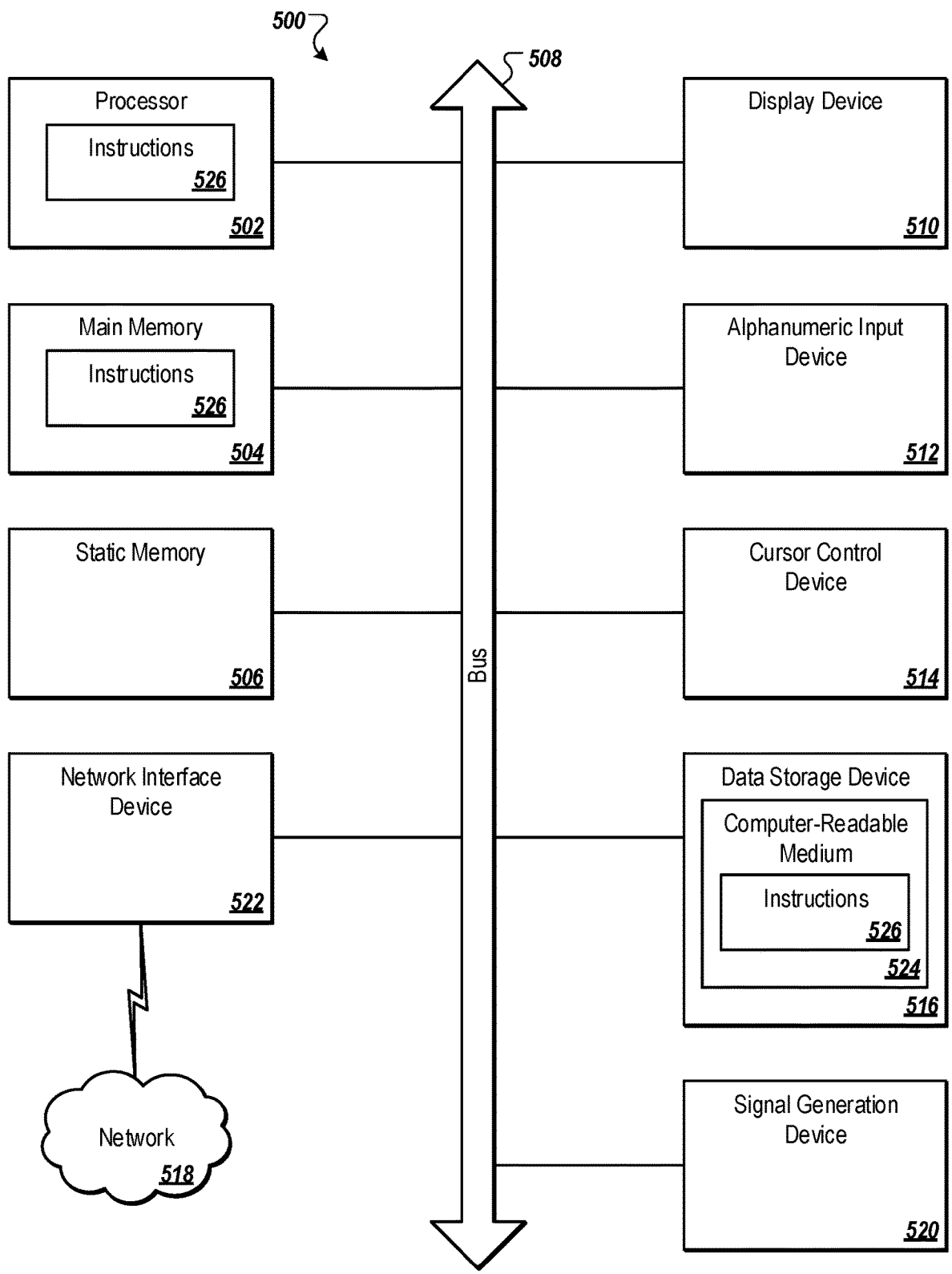
FIG. 5 illustrates a diagrammatic representation of a machine in the example form of a computing device, all according to at least one implementation described in the present disclosure.

FIG. 5 illustrates a diagrammatic representation of a machine in the example form of a computing device 500 within which a set of instructions, for causing the machine to perform any one or more of the methods discussed herein, may be executed. The computing device 500 may include a mobile phone, a smart phone, a netbook computer, a rack-mount server, a router computer, a server computer, a personal computer, a mainframe computer, a laptop computer, a tablet computer, a desktop computer, or any computing device with at least one processor, etc., within which a set of instructions, for causing the machine to perform any one or more of the methods discussed herein, may be executed. In alternative embodiments, the machine may be connected (e.g., networked) to other machines in a LAN, an intranet, an extranet, or the Internet. The machine may operate in the capacity of a server machine in client-server network environment. The machine may include a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" may also include any collection of machines that individually or jointly execute a set (or multiple sets) of instructions to perform any one or more of the methods discussed herein.

The example computing device 500 includes a processing device (e.g., a processor) 502, a main memory 504 (e.g., read-only memory (ROM), flash memory, dynamic random access memory (DRAM) such as synchronous DRAM (SDRAM)), a static memory 506 (e.g., flash memory, static random access memory (SRAM)) and a data storage device 516, which communicate with each other via a bus 508.

Processing device 502 represents one or more general-purpose processing devices such as a microprocessor, central processing unit, or the like. More particularly, the processing device 502 may include a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 502 may also include one or more special-purpose processing devices such as an application specific integrated circuit (ASIC), a field programmable gate array (FPGA), a digital signal processor (DSP), network processor, or the like. The processing device 502 is configured to execute instructions 526 for performing the operations and steps discussed herein.

The computing device 500 may further include one or more network interface devices 522 which may communicate with one or more networks 518. The computing device 500 also may include a display device 510 (e.g., a liquid crystal display (LCD) or a cathode ray tube (CRT)), an alphanumeric input device 512 (e.g., a keyboard), a cursor control device 514 (e.g., a mouse) and a signal generation device 520 (e.g., a speaker). In at least one embodiment, the display device 510, the alphanumeric input device 512, and/or the cursor control device 514 may be combined into a single component or device (e.g., an LCD touch screen).

The data storage device 516 may include a computer-readable storage medium 524 on which is stored one or more sets of instructions 526 embodying any one or more of the methods or functions described herein. The instructions 526 may also reside, completely or at least partially, within the main memory 504 and/or within the processing device 502 during execution thereof by the computing device 500, the main memory 504 and the processing device 502 also constituting computer-readable media. The instructions may further be transmitted or received over a network 518 via the network interface device 522.

While the computer-readable storage medium 524 is shown in an example embodiment to be a single medium, the term "computer-readable storage medium" may include a single medium or multiple media (e.g., a centralized or distributed database and/or associated caches and servers) that store the one or more sets of instructions. The term "computer-readable storage medium" may also include any medium that is capable of storing, encoding or carrying a set of instructions for execution by the machine and that cause the machine to perform any one or more of the methods of the present disclosure. The term "computer-readable storage medium" may accordingly be taken to include, but not be limited to, solid-state memories, optical media and magnetic media.

Unless specifically stated otherwise, as apparent from the discussion, it is appreciated that throughout the description, discussions utilizing terms such as detecting, determining, analyzing, identifying, scanning or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer-readable storage medium or a computer-readable signal medium.

An example apparatus can be multiple-input multiple-output (MIMO) apparatus supporting as many as N×N discrete communication streams over N antennas. In an example the MIMO apparatus signal processing units can be implemented as N×N. In various embodiments, the value of N can be 4, 6, 8, 12, 16, etc. Extended MIMO operation enable the use of up to 2N antennae in communication with another similarly equipped wireless system. It should be noted that extended MIMO systems can communicate with other wireless systems even if the systems do not have the same number of antennae, but some of the antennae of one of the stations might not be utilized, reducing optimal performance.

Channel State Information (CSI) from any of the devices described in this disclosure can be extracted independent of changes related to channel state parameters and used for spatial diagnosis services of the network such as motion detection, proximity detection, and localization which can be utilized in, for example, WLAN diagnosis, home security, health care monitoring, smart home utility control, elder care, automotive tracking and monitoring, home or mobile entertainment, automotive infotainment, and the like.

Unless specific arrangements described herein are mutually exclusive with one another, the various implementations described herein can be combined to enhance system functionality and/or to produce complementary functions. Such combinations will be readily appreciated by those skilled in the art given the totality of the foregoing description. Likewise, aspects of the implementations may be implemented in standalone arrangements where more limited and thus specific component functionality is provided within each of the interconnected—and therefore interacting—system components albeit that, in sum, they together support, realize and produce the described real-world effect(s). Indeed, it will be understood that unless features in the particular implementations are expressly identified as incompatible with one another or the surrounding context implies that they are mutually exclusive and not readily combinable in a complementary and/or supportive sense, the totality of this disclosure contemplates and envisions that specific features of those complementary implementations can be selectively combined to provide one or more comprehensive, but slightly different, technical solutions. It will, therefore, be appreciated that the above description has been given by way of example only and that modification in detail may be made within the scope of the present disclosure.

The subject technology of the present disclosure is illustrated, for example, according to various aspects described below. Various examples of aspects of the subject technology are described as numbered examples (1, 2, 3, etc.) for convenience. These are provided as examples and do not limit the subject technology. It is noted that any of the dependent examples or portions thereof may be combined in any combination, and placed into an independent examples, e.g., Examples 1, 2, and 3. The other examples can be presented in a similar manner. The following is a non-limiting summary of some examples presented herein.

Example 1 includes a method including obtaining first beamforming feedback from a station based on first sounding signals from a first set of antennas selected from multiple antennas of an access point, and obtaining second beamforming feedback from the station based on second sounding signals from a second set of antennas selected from the multiple antennas of the access point. The method may also include, using the first beamforming feedback and the second beamforming feedback, determining correlational relationships between pairs of the multiple antennas of the access point, and deriving a beamforming steering matrix from the correlational relationships.

Example 2 includes a wireless access point that includes multiple antennas, one or more processors, and one or more non-transitory computer-readable media containing instructions that, when executed by the one or more processors, are configured to cause the wireless access point to perform operations. The operations performed by the wireless access point of Example 2 include obtain first beamforming feedback from a station based on first sounding signals from a first set of antennas selected from the multiple antennas. The operations performed by the wireless access point of Example 2 also include obtain second beamforming feedback from the station based on second sounding signals from a second set of antennas selected from the multiple antennas. The operations performed by the wireless access point of Example 2 additionally include determine correlational relationships between pairs of antennas based on the first beamforming feedback and the second beamforming feedback. The operations performed by the wireless access point of Example 2 also include derive a beamforming steering matrix from the correlational relationships, and send a transmission to the station, the transmission beamformed according to the beamforming steering matrix.

Example 3 includes one or more non-transitory computer-readable media containing instructions that, when executed by one or more processors, cause a system to perform one or more operations that include obtain first beamforming feedback from a station based on first sounding signals from a first set of antennas selected from the multiple antennas. The operations also include obtain second beamforming feedback from the station based on second sounding signals from a second set of antennas selected from the multiple antennas. The operations additionally include determine correlational relationships between pairs of antennas based on the first beamforming feedback and the second beamforming feedback. The operations also include derive a beamforming steering matrix from the correlational relationships, and send a transmission to the station, the transmission beamformed according to the beamforming steering matrix.

With respect to the use of substantially any plural or singular terms herein, those having skill in the art can translate from the plural to the singular or from the singular to the plural as is appropriate to the context or application. The various singular/plural permutations may be expressly set forth herein for sake of clarity. A reference to an element in the singular is not intended to mean "one and only one" unless specifically stated, but rather "one or more." Moreover, nothing disclosed herein is intended to be dedicated to the public regardless of whether such disclosure is explicitly recited in the above description.

In general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). Furthermore, in those instances where a convention analogous to "at least one of A, B, and C, etc." is used, in general, such a construction is intended in the sense one having skill in the art would understand the convention (e.g., "a system having at least one of A, B, and C" would include but not be limited to systems that include A alone, B alone, C alone, A and B together, A and C together, B and C together, or A, B, and C together, etc.). Also, a phrase presenting two or more alternative terms, whether in the description, claims, or drawings, should be understood to include one of the terms, either of the terms, or both terms. For example, the phrase "A or B" will be understood to include the possibilities of "A" or "B" or "A and B."

The present disclosure may be embodied in other specific forms without departing from its spirit or essential characteristics. The described implementations are to be considered in all respects only as illustrative and not restrictive. The scope of the present disclosure is, therefore, indicated by the appended claims rather than by the foregoing description. All changes which come within the meaning and range of equivalency of the claims are to be embraced within their scope.

What is claimed is:

1. A method comprising:
transmitting, by a station, first beamforming feedback in response to first sounding signals from a first set of antennas of a wireless device;
transmitting, by the station, second beamforming feedback in response to second sounding signals from a second set of antennas of the wireless device;
transmitting, by the station, additional beamforming feedback in response to additional sounding signals until every potential pairing of antennas within a set of antennas of the wireless device including the first set of antennas and the second set of antennas has corresponding beamforming feedback; and
receiving, by the station, data that is beamformed according to a steering matrix, the steering matrix based on correlational relationships between the every potential pairing of the antennas, the correlational relationships based on beamforming feedback, including the first and the second beamforming feedback, first portions of a correlational matrix corresponding to relationships between antennas in the first set of antennas, and second portions of the correlational matrix corresponding to relationships between antennas in the second set of antennas.

2. The method of claim 1, further comprising:
receiving, by the station, the first sounding signals and the second sounding signals from the wireless device; and
receiving data packets at the station, the data packets beamformed according to the steering matrix.

3. The method of claim 2, wherein the first sounding signals the second sounding signals, and the additional sounding signals are received in parallel and with different tones.

4. The method of claim 3, wherein the correlational relationships between the every potential pairing of the antennas are adjusted based on the different tones of the first sounding signals, the second sounding signals and the additional sounding signals.

5. The method of claim 2, wherein the first sounding signals and the second sounding signals are received at different times and with a same tone.

6. The method of claim 1, further comprising accounting for redundancy in the correlational matrix based on overlap between pairs of antennas in the first set of antennas and the second set of antennas such that after accounting for the redundancy, the correlational matrix includes a single value for each of the pairs of antennas.

7. The method of claim 1, wherein deriving the steering matrix is independent of phase rotations between the first beamforming feedback and the second beamforming feedback.

8. The method of claim 1, wherein the first set of antennas and the second set of antennas are at a single wireless access point, and wherein the wireless device comprises the single wireless access point.

9. A wireless station, comprising:
one or more antennas;
one or more processors; and
one or more non-transitory computer-readable media containing instructions that, when executed by the one or more processors, are configured to cause the wireless station to perform operations, the operations comprising:
instructing the one or more antennas to transmit first beamforming feedback in response to first sounding signals from a first set of antennas of a wireless device;
instructing the one or more antennas to transmit second beamforming feedback in response to second sounding signals from a second set of antennas of the wireless device;
transmitting additional beamforming feedback in response to additional sounding signals until every potential pairing of antennas within a set of antennas of the wireless device including the first set of antennas and the second set of antennas has corresponding beamforming feedback; and
receiving, at the one or more antennas, data that is beamformed according to a steering matrix, the steering matrix based on correlational relationships between the every potential pairing of the antennas, the correlational relationships based on beamforming feedback, including the first and the second beamforming feedback, first portions of a correlational matrix corresponding to relationships between antennas in the first set of antennas, and second portions of the correlational matrix corresponding to relationships between antennas in the second set of antennas.

10. The wireless station of claim 9, the operations further comprising:
receiving, via the one or more antennas of the wireless station, the first sounding signals and the second sounding signals; and
receiving data packets via the one or more antennas of the wireless station, the data packets beamformed according to the steering matrix.

11. The wireless station of claim 10, wherein the first sounding signals the second sounding signals, and the additional sounding signals are received in parallel and with different tones.

12. The wireless station of claim 11, wherein the correlational relationships between the every potential pairing of the antennas are adjusted based on the different tones of the first sounding signals, the second sounding signals and the additional sounding signals.

13. The wireless station of claim 10, wherein the first sounding signals and the second sounding signals are received at different times and with a same tone.

14. The wireless station of claim 9, the operations further comprising accounting for redundancy in the correlational matrix based on overlap between pairs of antennas in the first set of antennas and the second set of antennas such that after accounting for the redundancy, the correlational matrix includes a single value for each of the pairs of antennas.

15. The wireless station of claim 9, wherein deriving the steering matrix is independent of phase rotations between the first beamforming feedback and the second beamforming feedback.

16. The wireless station of claim 9, wherein the first sounding signals and the second sounding signals are received from a single wireless access point, and wherein the wireless device comprises the single wireless access point.

17. One or more non-transitory computer-readable media containing instructions that, when executed by one or more processors, are configured to cause a wireless station to perform operations, the operations comprising:
instructing one or more antennas of the wireless station to transmit first beamforming feedback in response to first sounding signals from a first set of antennas of a wireless device;
instructing the one or more antennas to transmit second beamforming feedback in response to second sounding signals from a second set of antennas of the wireless device;
transmitting additional beamforming feedback in response to additional sounding signals until every potential pairing of antennas within a set of antennas of the wireless device including the first set of antennas and the second set of antennas has corresponding beamforming feedback; and
receiving, at the one or more antennas, data that is beamformed according to a steering matrix, the steering matrix based on correlational relationships between the every potential pairing of the antennas, the correlational relationships based on beamforming feedback, including the first and the second beamforming feedback, first portions of a correlational matrix corresponding to relationships between antennas in the first set of antennas, and second portions of the correlational matrix corresponding to relationships between antennas in the second set of antennas.

18. The non-transitory computer-readable media of claim 17, the operations further comprising:
receiving, via the one or more antennas of the wireless station, the first sounding signals and the second sounding signals; and
receiving data packets via the one or more antennas of the wireless station, the data packets beamformed according to the steering matrix.

19. The non-transitory computer-readable media of claim 18, wherein the first sounding signals the second sounding signals, and the additional sounding signals are received in parallel and with different tones.

20. The non-transitory computer-readable media of claim 17, wherein the first sounding signals and the second sounding signals are received from a single wireless access point, and wherein the wireless device comprises the single wireless access point.

* * * * *